US010379395B2

(12) United States Patent
Lee et al.

(10) Patent No.: US 10,379,395 B2
(45) Date of Patent: Aug. 13, 2019

(54) COLOR CONVERSION PANEL AND DISPLAY DEVICE INCLUDING THE SAME

(71) Applicant: SAMSUNG DISPLAY CO., LTD., Yongin-si, Gyeonggi-do (KR)

(72) Inventors: Kwang Keun Lee, Osan-si (KR); Young Min Kim, Asan-si (KR); Hae Il Park, Seoul (KR); Moon Jung Baek, Seoul (KR); Seon-Tae Yoon, Seoul (KR); Jun Han Lee, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 268 days.

(21) Appl. No.: 15/492,246

(22) Filed: Apr. 20, 2017

(65) Prior Publication Data

US 2017/0307932 A1 Oct. 26, 2017

(30) Foreign Application Priority Data

Apr. 26, 2016 (KR) ........................ 10-2016-0050982

(51) Int. Cl.
*G02B 5/22* (2006.01)
*G02F 1/1333* (2006.01)
(Continued)

(52) U.S. Cl.
CPC ....... *G02F 1/133512* (2013.01); *G02B 5/201* (2013.01); *G02F 1/133514* (2013.01);
(Continued)

(58) Field of Classification Search
CPC ..... G02B 5/201; G02B 5/22; G02F 1/133512; G02F 1/133514; G02F 1/133553
(Continued)

(56) References Cited

U.S. PATENT DOCUMENTS 7,750,984 B2   7/2010  Ha et al.
8,277,064 B2  10/2012  Willemsen et al.
(Continued)

FOREIGN PATENT DOCUMENTS

KR  10-2006-0050610 A   5/2006
KR  10-2011-0056819 A   5/2011
(Continued)

OTHER PUBLICATIONS

G. J. Heo, et al., "Color PH-LCD Using STN Mode", PLC2-3, IDW '98, pp. 221-224.
(Continued)

*Primary Examiner* — Ricky D Shafer
(74) *Attorney, Agent, or Firm* — Lee & Morse, P.C.

(57) ABSTRACT

A color conversion panel includes a substrate, a light blocking layer on the substrate, and color conversion layers and a transmission layer on the substrate, the color conversion layers including a quantum dot, wherein the light blocking layer includes a first sub-light blocking layer overlapping the color conversion layers and the transmission layer, and a second sub-light blocking layer between adjacent ones of the color conversion layers and the transmission layer, and wherein each of the first sub-light blocking layer and the second sub-light blocking layer includes an external light absorption layer on the substrate, and a reflection layer on the external light absorption layer.

18 Claims, 9 Drawing Sheets

(51) Int. Cl.
*G02F 1/1335* (2006.01)
*G02B 5/20* (2006.01)
*G02B 5/28* (2006.01)

(52) U.S. Cl.
CPC .. *G02F 1/133553* (2013.01); *G02F 1/133617* (2013.01); *G02B 5/22* (2013.01); *G02B 5/288* (2013.01)

(58) Field of Classification Search
USPC .......................... 359/891; 349/106, 110, 113
See application file for complete search history.

(56) References Cited

U.S. PATENT DOCUMENTS

| | | | | |
|---|---|---|---|---|
| 2007/0040965 | A1* | 2/2007 | Kuan | G02F 1/33553 349/113 |
| 2010/0090595 | A1* | 4/2010 | Nomura | B29D 11/00596 313/506 |
| 2011/0249339 | A1* | 10/2011 | Horie | G02F 1/133512 359/601 |
| 2015/0048395 | A1 | 2/2015 | Vampola et al. | |
| 2015/0049287 | A1* | 2/2015 | Chang | G02F 1/133512 349/110 |
| 2016/0154172 | A1* | 6/2016 | Komano | G02B 6/0055 349/65 |
| 2016/0252785 | A1* | 9/2016 | Kimura | G02F 1/13338 349/12 |

FOREIGN PATENT DOCUMENTS

| | | |
|---|---|---|
| KR | 10-2013-0081379 A | 7/2013 |
| KR | 10-2014-0074495 A | 6/2014 |
| KR | 10-2015-0003237 A | 1/2015 |
| WO | WO 2013/144927 A1 | 10/2013 |

OTHER PUBLICATIONS

Swie Lan Njo, et al., "23.3: Light-Efficient Liquid Crystal Displays Using Photoluminescent Color Filters", Philips Research Laboratories, Eindhoven, The Netherlands, Ian.njo@philips.com, Eindhoven University of Technology, Eindhoven, The Netherlands, SID 00 Digest, pp. 343-345.

Jeong Rok Oh, et al., "Highly efficient full-color display based on blue LED backlight and electrochromic light-valve coupled with front-emitting phosphors", Department of Chemistry and Physics, Kookmin University, Seoul, Korea, Aug. 15, 2011, vol. 19, No. 17, Optics Express 16022, pp. 16022-16031.

* cited by examiner

COLOR CONVERSION PANEL AND DISPLAY DEVICE INCLUDING THE SAME

CROSS-REFERENCE TO RELATED APPLICATION

Korean Patent Application No. 10-2016-0050982, filed on Apr. 26, 2016, in the Korean Intellectual Property Office, and entitled: "Color Conversion Panel and Display Device Including the Same," is incorporated by reference herein in its entirety.

BACKGROUND

1. Field

The present disclosure relates to a color conversion panel and a display device including the same.

2. Description of the Related Art

A liquid crystal display used as a display device has a field generating electrode on one of two display panels. Among them, a plurality of thin film transistors and pixel electrodes may be disposed in a matrix form on one display panel (referred to as a thin film transistor array panel hereinafter), and color filters of red, green, and blue may be disposed on another display panel (referred to as a common electrode panel hereinafter), while its front may be covered by a common electrode.

SUMMARY

An exemplary embodiment provides a color conversion panel including a substrate; a light blocking layer disposed on the substrate; and a color conversion layer including a quantum dot, and a transmission layer disposed on the light blocking layer, wherein the light blocking layer includes a first sub-light blocking layer overlapping the color conversion layer and the transmission layer, and a second sub-light blocking layer disposed between the adjacent color conversion layer and the transmission layer, and the first sub-light blocking layer and the second sub-light blocking layer respectively include an external light absorption layer disposed on the substrate, and a reflection layer disposed on the external light absorption layer.

The first sub-light blocking layer may be narrower than the second sub-light blocking layer.

The external light absorption layer may include an organic light-blocking material.

The external light absorption layer may include a first metal layer disposed on the substrate, and a first inorganic layer disposed on the first metal layer.

The color conversion panel may further include a second inorganic layer between the first metal layer and the substrate.

The first inorganic layer and the second inorganic layer may include a metal oxide.

The first metal layer may include at least one of Cr, Mo, and Ti.

The reflection layer may include a metal material.

The color conversion panel may further include an optical layer disposed between the light blocking layer and the color conversion layer and transmission layer, and a refractive index of the optical layer is about 1.0 to 1.4.

The color conversion panel may further include a color filter disposed between the substrate and the color conversion layer.

The color conversion panel may further include a capping layer disposed between the color conversion layer and the transmission layer.

Another embodiment provides a display device including a display panel; and a color conversion panel disposed on the display panel, wherein the color conversion panel includes a substrate overlapping the display panel, a light blocking layer disposed between the substrate and the display panel, and a color conversion layer and a transmission layer disposed between the light blocking layer and the display panel, and including a quantum dot, the light blocking layer includes a first sub-light blocking layer overlapping the color conversion layer and the transmission layer, and a second sub-light blocking layer disposed between the adjacent color conversion layer and the transmission layer, and the first sub-light blocking layer and the second sub-light blocking layer respectively include an external light absorption layer disposed between the substrate and the display panel, and a reflection layer disposed between the external light absorption layer and the display panel.

The first sub-light blocking layer may be narrower than the second sub-light blocking layer.

The display panel may include a plurality of pixels in a matrix form, and the color conversion layer and the transmission layer respectively overlap at least one of the pixels.

The external light absorption layer may include an organic light-blocking material.

The external light absorption layer may include a first metal layer disposed between the substrate and the display panel, and a first inorganic layer disposed between the first metal layer and the display panel.

The display device may further include a second inorganic layer disposed between the first metal layer and the substrate.

The display device may further include an optical layer disposed between the light blocking layer and the color conversion layer and transmission layer, wherein a refractive index of the optical layer is about 1.0 to 1.4.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
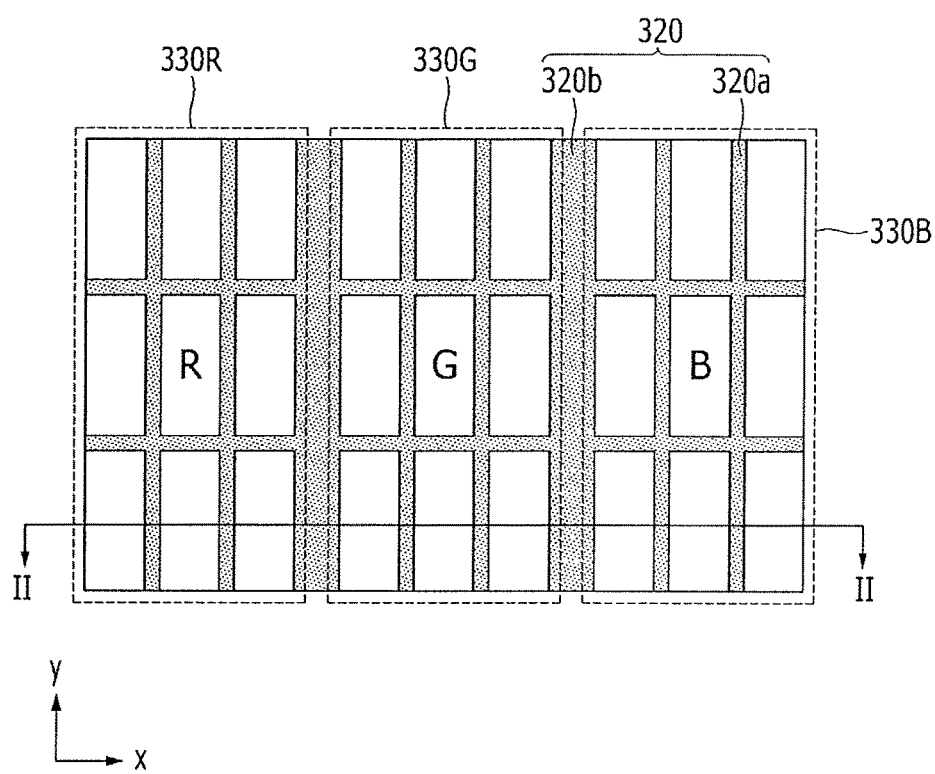
FIG. 1 illustrates a top plan view of a color conversion panel according to a present exemplary embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

An upper part of a target portion indicates an upper part or a lower part of the target portion, and it does not mean that the target portion is always positioned at the upper side based on a gravitational direction. In addition, unless explicitly described to the contrary, the word "comprise" and variations such as "comprises" or "comprising" will be understood to imply the inclusion of stated elements but not the exclusion of any other elements. The phrase "on a plane" means viewing the object portion from the top, and the phrase "on a cross-section" means viewing a cross-section of which the object portion is vertically cut from the side.

A color conversion panel according to a present exemplary embodiment will now be described with reference to FIG. 1 and FIG. 2. FIG. 1 shows a top plan view of a color conversion panel according to a present exemplary embodiment, and FIG. 2 shows a cross-sectional view along line II-II of FIG. 1.

Figure 2:
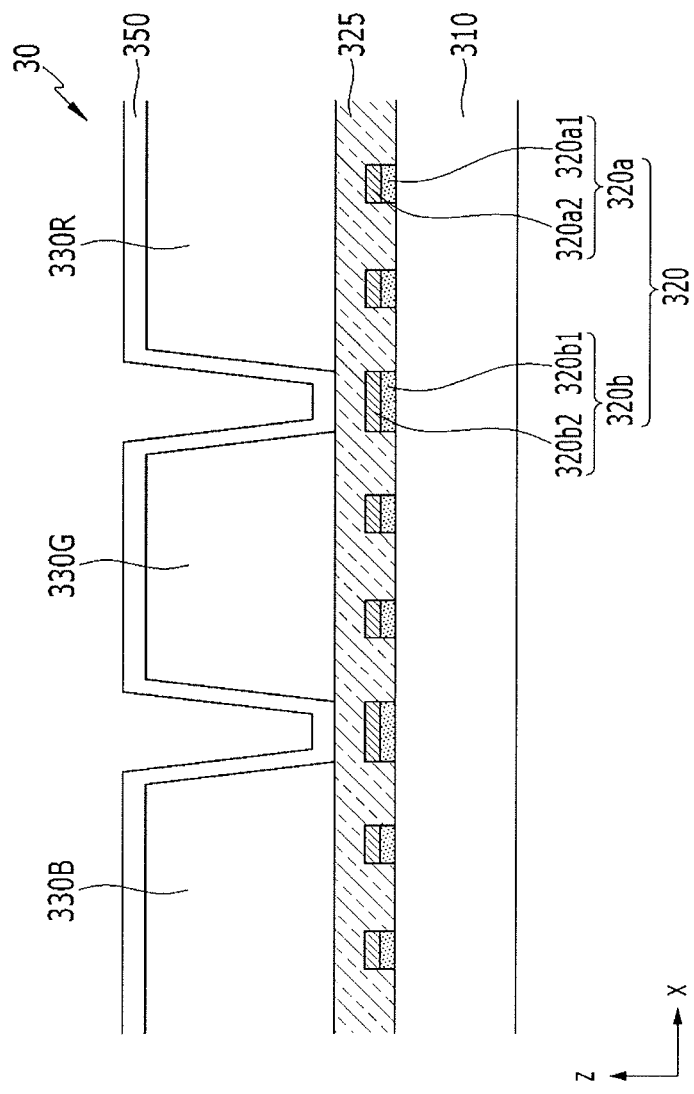
FIG. 2 illustrates a cross-sectional view along line II-II of FIG. 1.

Referring to FIG. 1 and FIG. 2, a color conversion panel 30 may include a light blocking layer 320 disposed on a substrate 310. As will be discussed in more detail below with reference to FIGS. 4-6, the light blocking layer 320 is disposed between a display panel and the substrate 310, so light emitted by the display panel to display an image is emitted through the light blocking layer 320 toward the substrate 310.

An aperture ratio of the light blocking layer 320 may be in a range of about 40% to 90%. Reflectance of external light generated by the color conversion panel 30 is proportional to a square of the aperture ratio of the light blocking layer 320, e.g., a light blocking layer 320 with an aperture ratio of 70% may reduce reflectance of the color conversion panel 30 by about 50%.

As illustrated in FIG. 2, the light blocking layer 320 may include a first sub-light blocking layer 320a and a second sub-light blocking layer 320b. The first sub-light blocking layer 320a overlaps a plurality of color conversion layers 330R and 330G, and a transmission layer 330B. The second sub-light blocking layer 320b excludes the first sub-light blocking layer 320a. The first sub-light blocking layer 320a and the second sub-light blocking layer 320b may be distinguished depending on positioning regions. For example, the first sub-light blocking layer 320a and the second sub-light blocking layer 320b may be formed of identical materials and by identical processes, e.g., and may be distinguished from each other only by their shape and position.

The first sub-light blocking layer 320a overlaps the plurality of color conversion layers 330R and 330G and the transmission layers 330B. In detail, the first sub-light blocking layer 320a may be disposed to cross one of the color conversion layers 330R and 330G and one transmission layer 330B. For example, as illustrated in FIG. 1, the first sub-light blocking layer 320a may traverse one or more of the color conversion layers 330R and 330G and the transmission layer 330B, e.g., may include a plurality of intersecting linear bars overlapping the color conversion layers 330R and 330G and the transmission layer 330, as viewed in a plan view. For example, as illustrated in FIG. 1, the first sub-light blocking layer 320a may have a lattice, e.g., mesh, form, but embodiments are not limited thereto. For example, the first sub-light blocking layer 320a may have a stripe form, e.g., so a plurality of stripes spaced apart from each other may traverse each of the color conversion layers 330R and 330G and the transmission layer 330B.

The second sub-light blocking layer 320b is disposed between, e.g., among, the plurality of color conversion layers 330R and 330G and transmission layers 330B. In detail, the second sub-light blocking layer 320b may be disposed between the adjacent red color conversion layer 330R and the green color conversion layer 330G, between the adjacent green color conversion layer 330G and the transmission layer 330B, and between the adjacent transmission layer 330B and the red color conversion layer 330R. That is, the second sub-light blocking layer 320b may partition regions where the red color conversion layer 330R, the green color conversion layer 330G, and the transmission layer 330B are disposed. The second sub-light blocking layer 320b may overlap part of the adjacent red color conversion layer 330R, the green color conversion layer 330G, and the transmission layer 330B according to a manufacturing process, but it is not disposed to traverse a plurality of color conversion layers 330R and 330G and transmission layers 330B like the first sub-light blocking layer 320a.

The first sub-light blocking layer 320a may be narrower, e.g., along the x-axis, than the second sub-light blocking layer 320b. The first sub-light blocking layer 320a overlapping the red color conversion layer 330R, the green color conversion layer 330G, and the transmission layer 330B is disposed to be narrower than the second sub-light blocking layer 320b, thereby preventing the first sub-light blocking layer 320a from being visible to a user and helping absorption of external light.

The first sub-light blocking layer 320a and the second sub-light blocking layer 320b respectively include external light absorption layers 320a1 and 320b1 disposed, e.g., directly, on the substrate 310, and reflection layers 320a2 and 320b2 disposed, e.g., directly, on the external light absorption layers 320a1 and 320b1, respectively. In detail, the first sub-light blocking layer 320a includes the first external light absorption layer 320a1 and the first reflection layer 320a2, and the second sub-light blocking layer 320b includes the second external light absorption layer 320b1 and the second reflection layer 320b2. The first sub-light blocking layer 320a and the second sub-light blocking layer 320b according to the present exemplary embodiment may have a double stacked structure including an external light absorption layer and a reflection layer.

The external light absorption layers 320a1 and 320b1 may include an organic light-blocking material, and may be generated by a process for coating and exposing the organic light-blocking material. The external light absorption layers 320a1 and 320b1 absorb the external light that is input to the color conversion layers 330R and 330G and the transmission layer 330B from outside of the substrate 310. For example, external light incident on the substrate 310 and transmitted through the substrate 310 toward the color conversion layers 330R and 330G and the transmission layer 330B may be blocked, e.g., absorbed, by the external light absorption layers 320a1 and 320b1 therebetween.

When a large amount of external light is reflected from the color conversion layers 330R and 330G and the transmission layer 330B, color reproducibility distortion of the color conversion panel may occur. However, when the external light absorption layers 320a1 and 320b1 are disposed on the substrate 310 according to the present exemplary embodiment, distortion of colors by the external light may be reduced.

The reflection layers 320a2 and 320b2 are disposed between the external light absorption layers 320a1 and 320b1 and the color conversion layers 330R and 330G and/or between the external light absorption layers 320a1 and 320b1 and the transmission layer 330B. For example, as illustrated in FIG. 2, the reflection layers 320a2 and 320b2 and the respective external light absorption layers 320a1 and 320b1 completely overlap each other. The reflection layers 320a2 and 320b2 may include any suitable metal for reflecting light, e.g., at least one of Ag, Au, Cu, and Al. The reflection layers 320a2 and 320b2 including metal may be disposed by, e.g., deposition and/or an etching process. However, embodiments are not limited thereto.

The reflection layers 320a2 and 320b2 reflect the light emitted from the color conversion layers 330R and 330G and/or the transmission layer 330B toward the substrate 310. That is, light that is generated and emitted from the display panel toward the substrate 310 via the color conversion layers 330R and 330G and the transmission layer 330B in order to display an image, and that is incident on the reflection layers 320a2 and 320b2, is reflected by the reflection layers 320a2 and 320b2 back toward the color conversion layers 330R and 330G and/or the transmission layer 330B. Light that is generated and emitted from the display panel toward the substrate 310 via the color conversion layers 330R and 330G and the transmission layer 330B in order to display an image, and that is not incident on the reflection layers 320a2 and 320b2, i.e., transmitted between the reflection layers 320a2 and 320b2, displays an image.

In detail, if there were no reflection layer, light emitted from the color conversion layers 330R and 330G or the transmission layer 330B toward the substrate 310, and incident on the external light absorption layers 320a1 and 320b1, would have been absorbed by the external light absorption layers 320a1 and 320b1, thereby reducing a light output ratio of the color conversion panel. However, according to the present exemplary embodiment, the reflection layers 320a2 and 320b2, which are disposed on and cover the external light absorption layers 320a1 and 320b1, cause light emitted by the color conversion layers 330R and 330G and/or the transmission layer 330B and incident on the reflection layers 320a2 and 320b2 to be reflected back toward the color conversion layers 330R and 330G and/or the transmission layer 330B. As such, light incident on the reflection layers 320a2 and 320b2 is reflected back toward the color conversion layers 330R and 330G and/or the transmission layer 330B to be recycled, rather than being absorbed by the external light absorption layers 320a1 and 320b1, thereby increasing light output toward the, e.g., external side of the, substrate 310. In addition, while the aperture ratio may be reduced by the external light absorption layers 320a1 and 320b1 and the light output ratio may be reduced, the reduction of the light output ratio may be minimized by reflecting the light input by the reflection layers 330a2 and 330b2 and recycling the light of the reflection layer.

An optical layer 325 is disposed on the substrate 310 and the light blocking layer 320. The optical layer 325 may have a refractive index that is less than that of the substrate 310, e.g., the refractive index of the optical layer 325 may be about 1.0 to about 1.4.

For example, the optical layer 325 may include a porous silica-based material. The optical layer 325 with the low refractive index may reduce loss of light occurring at an interface of the substrate 310 and the external side, and may offset the loss of light output that may be generated by introducing the light blocking layer 320.

The plurality of color conversion layers 330R and 330G and the transmission layer 330B are disposed on the optical layer 325. The plurality of color conversion layers 330R and 330G output light incident thereon as light of different colors, e.g., the color conversion layers 330R and 330G may be a red color conversion layer 330R and a green color conversion layer 330G. The transmission layer 330B may output light incident, e.g., input, thereon without a color conversion, e.g., it may receive blue light and output blue light.

The red color conversion layer 330R includes at least one of a phosphor for converting the incident blue light into red light and a quantum dot. When the red color conversion layer 330R includes a red phosphor, the red phosphor may be one of, e.g., (Ca, Sr, Ba)S, (Ca, Sr, Ba)$_2$Si$_5$N$_8$, CaAlSiN$_3$, CaMoO$_4$, and Eu$_2$Si$_5$N$_8$, but it is not limited thereto. The red color conversion layer 330R may include at least one kind of red phosphor.

The green color conversion layer 330G includes at least one of a phosphor for converting the incident blue light into green light and a quantum dot. When the green color conversion layer 330G includes a green phosphor, the green phosphor may be one of, e.g., yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$, but it is not limited thereto. The green color conversion layer 330G may include at least one kind of green phosphor. Here, the x may be a random number between 0 and 1.

The red color conversion layer 330R and the green color conversion layer 330G may include a quantum dot for converting color instead of the phosphor, or may further include a quantum dot in addition to the phosphor. In this case, the quantum dot may be from, e.g., a group II-VI compound, a group III-V compound, a group IV-VI compound, a group IV element, a group IV compound, and a combination thereof.

The group II-VI compound may be at least one of a two-element compound, e.g., CdSe, CdTe, ZnS, ZnSe, ZnTe, ZnO, HgS, HgSe, HgTe, MgSe, MgS, and a mixture thereof; a three-element compound, e.g., CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound, e.g., HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The group III-V compound may be selected from at least one of a two-element compound, e.g., GaN, GaP, GaAs, GaSb, AlN, AlP, AlAs, AlSb, InN, InP, InAs, InSb, and a mixture thereof; a three-element compound, e.g., GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a four-element compound, e.g., GaAlNAs, GaAlNSb, GaAlPAs, GaAlPSb, GaInNP, GaInNAs, GaInNSb, GaInPAs, GaInPSb, GaAlNP, InAlNP, InAl- NAs, InAlNSb, InAlPAs, InAlPSb, and a mixture thereof. The group IV-VI compound may be selected from at least one of a two-element compound, e.g., SnS, SnSe, SnTe, PbS, PbSe, PbTe, and a mixture thereof; a three-element compound, e.g., SnSeS, SnSeTe, SnSTe, PbSeS, PbSeTe, PbSTe, SnPbS, SnPbSe, SnPbTe, and a mixture thereof; and a four-element compound, e.g., SnPbSSe, SnPbSeTe, SnPbSTe, and a mixture thereof. The Group IV element may be, e.g., one of Si, Ge, and a mixture thereof. The Group IV compound may be a two-element compound, e.g., at least one of SiC, SiGe, and a mixture thereof.

In this case, the two-element compound, the three-element compound, or the four-element compound may exist in particles at a uniform concentration, or in the same particle while being divided to have partially different concentration distributions. Alternatively, they may have a core/shell structure where one quantum dot encloses another quantum dot. An interface between the core and the shell may have a concentration gradient, such that a concentration of an element existing in the shell gradually decreases closer to a center of the interface.

The quantum dot may have a full width at half maximum (FWHM) of the light-emitting wavelength spectrum that is equal to or less than about 45 nm. For example, the quantum dot may have a full width at half maximum (FWHM) of the light-emitting wavelength spectrum that is equal to or less than about 40 nm, e.g., equal to or less than about 30 nm. In the aforementioned range, color purity or color reproducibility may be improved. In addition, since light emitted through the quantum dot is emitted in all directions, a viewing angle of light may be improved.

In addition, the quantum dot is not specifically limited to have shapes that are generally used in the technical field related to the present disclosure. For example, the quantum dot may have a shape such as a nano-particle having a spherical shape, a pyramid shape, a multi-arm shape, or a cubic shape, or may be a nanotube, a nanowire, a nanofiber, a planar nano-particle, etc.

The transmission layer 330B may include a resin that transmits blue light incident thereto. The transmission layer 330B positioned in a region for emitting blue light emits the incident blue light at it is without a separate phosphor or a quantum dot. In some exemplary embodiments, the transmission layer 330B may further include a dye or pigment.

The red color conversion layer 330R, the green color conversion layer 330G, and the transmission layer 330B may include, e.g., a photosensitive resin, and may be manufactured by, e.g., a photolithography process. Alternatively, the red color conversion layer 330R, the green color conversion layer 330G, and the transmission layer 330B may be manufactured by a printing process, and when manufactured by the printing process, they may include materials other than the photosensitive resin. While it is illustrated that the color conversion layer, the transmission layer, and the light blocking layer are formed by the photolithography process or the printing process, the present disclosure is not limited thereto.

At least one of the red color conversion layer 330R, the green color conversion layer 330G, and the transmission layer 330B may include a scatterer. For example, the red color conversion layer 330R, the green color conversion layer 330G, and the transmission layer 330B may respectively include the scatterer. However, embodiments are not limited thereto, e.g., the transmission layer 330B may include the scatterer, while the red color conversion layer 330R and the green color conversion layer 330G may not include the scatterer. The scatterer may include any material that can evenly scatter incident light, e.g., may include at least one of $TiO_2$, $ZrO_2$, $Al_2O_3$, $In_2O_3$, ZnO, $SnO_2$, $Sb_2O_3$, and ITO.

A capping layer 350 is disposed on the red color conversion layer 330R, the green color conversion layer 330G, the transmission layer 330B, and the optical layer 325. The capping layer 350 may be a filter that prevents damage and quenching of the phosphor or the quantum dots included in the red color conversion layer 330R and the green color conversion layer 330G during high temperature processes after the red color conversion layer 330R, the green color conversion layer 330G, and the transmission layer 330B are formed. The filter may also transmit light of a predetermined wavelength and reflect or absorb light other than that of the predetermined wavelength.

The capping layer 350 may include a structure in which inorganic layers having a high refractive index and inorganic layers having a low refractive index are alternately stacked about 10 to 20 times. The capping layer 350 may have a structure in which a plurality of layers having different refractive indexes are stacked. In this case, the capping layer 350 may reflect or absorb light of a specific wavelength. It may transmit and/or reflect the light of the specific wavelength by using constructive interference and/or destructive interference between the inorganic film having the high refractive index and the inorganic film having the low refractive index.

The capping layer 350 may include at least one of $TiO_2$, $SiN_x$, $SiO_x$, TiN, AlN, $Al_2O_3$, $SnO_2$, $WO_3$, and $ZrO_2$. For example, the capping layer 350 may include a structure in which $SiN_x$ and $SiO_x$ are alternately stacked.

The color conversion panel according to the present exemplary embodiment includes the light blocking layer 320 disposed between the substrate 310 and the color conversion layers 330R and 330G and/or between the substrate 310 and the transmission layer 330B. The light blocking layer 320 includes the first sub-light blocking layer 320a and the second sub-light blocking layer 320b, such that the first sub-light blocking layer 320a is disposed to traverse the color conversion layers 330R and 330G and the transmission layer 330B and overlap the same, and the second sub-light blocking layer 320b is disposed to partition adjacent ones of the red color conversion layer 330R, the green color conversion layer 330G, and the transmission layer 330B to reduce reflection of external light.

The first sub-light blocking layer 320a and the second sub-light blocking layer 320b respectively include the external light absorption layers 320a1 and 320b1 and the reflection layers 320a2 and 320b2. Accordingly, the external light absorption layers 320a1 and 320b1 reduce reflection caused by external light, and the reflection layers 320a2 and 320b2 reflect light output by the color conversion layer 330R and 330G and the transmission layer 330B back to the color conversion layers 330R and 330G and the transmission layer 330B to increase the optical output ratio.

Figure 3:
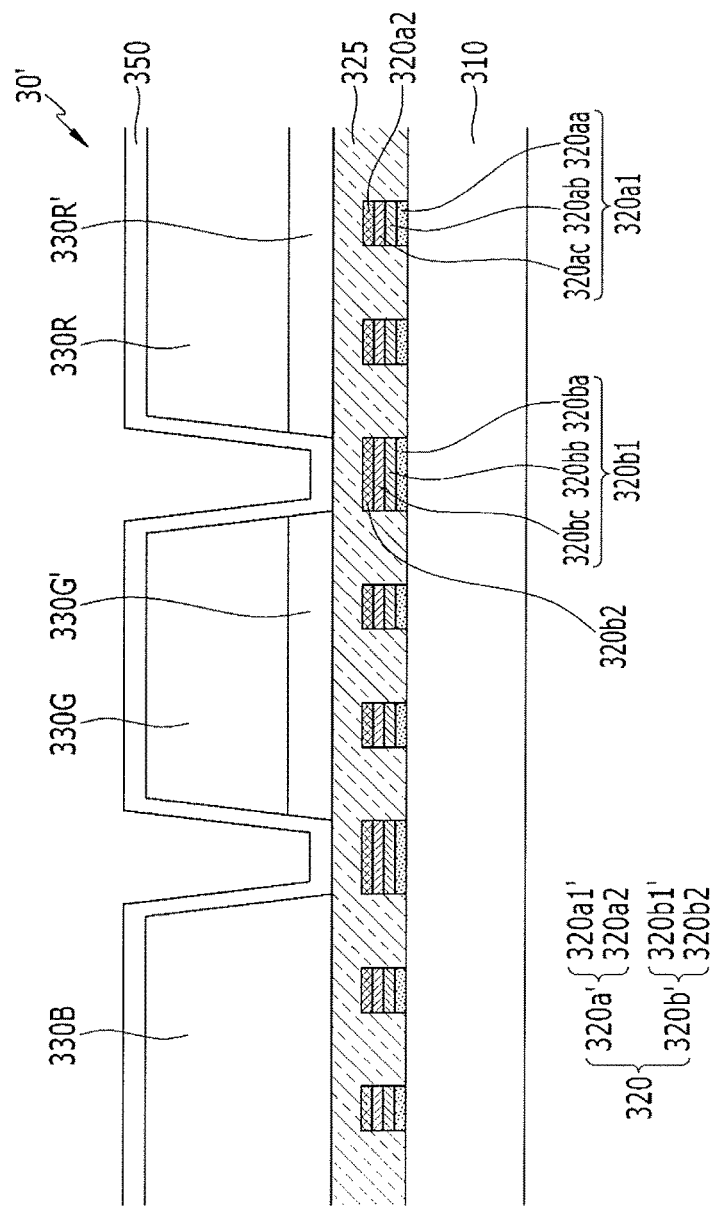
FIG. 3 illustrates a cross-sectional view according to a modified exemplary embodiment of FIG. 2.

A color conversion panel according to a varied exemplary embodiment will now be described with reference to FIG. 3. FIG. 3 shows a cross-sectional view according to a varied exemplary embodiment of FIG. 2. Like constituent elements as those described with reference to FIG. 1 and FIG. 2 will not be described.

Referring to FIG. 3, a color conversion panel 30' may include a light blocking layer 320' disposed on the substrate 310. The light blocking layer 320' includes a first sub-light blocking layer 320a' and a second sub-light blocking layer 320b'.

The first sub-light blocking layer 320*a*' may overlap the plurality of color conversion layers 330R and 330G and the transmission layer 330B, and may be disposed to traverse the color conversion layers 330R and 3306 and the transmission layer 330B. The second sub-light blocking layer 320*b*' may be disposed between the adjacent red color conversion layer 330R and green color conversion layer 330G, between the adjacent green color conversion layer 330G and transmission layer 330B, and between the adjacent transmission layer 330B and red color conversion layer 330R, and may partition the region in which the red color conversion layer 330R, the green color conversion layer 330G, and the transmission layer 330B are disposed. The second sub-light blocking layer 320*b*' may partly overlap the adjacent red color conversion layer 330R, the green color conversion layer 330G, and the transmission layer 330B according to the manufacturing process, but it is not disposed to traverse a plurality of color conversion layers 330R and 330G and a transmission layer 330B like the first sub-light blocking layer 320*a*' as a difference.

The first sub-light blocking layer 320*a*' and the second sub-light blocking layer 320*b*' may be distinguished according to the positioning region. The first sub-light blocking layer 320*a*' and the second sub-light blocking layer 320*b*' respectively include external light absorption layers 320*a*1' and 320*b*1' disposed on the substrate 310, and reflection layers 320*a*2 and 320*b*2 disposed on the external light absorption layers 320*a*1' and 320*b*1'. In detail, the first sub-light blocking layer 320*a*' may include the first external light absorption layer 320*a*1' and the first reflection layer 320*a*2, and the second sub-light blocking layer 320*b*' may include the second external light absorption layer 320*b*1' and the second reflection layer 320*b*2.

The external light absorption layers 320*a*1' and 320*b*1' may include second inorganic layers 320*aa* and 320*ba* disposed on the substrate 310, first metal layers 320*ab* and 320*bb* disposed on the second inorganic layers 320*aa* and 320*ba*, and first inorganic layers 320*ac* and 320*bc* disposed on the first metal layers 320*ab* and 320*bb*. For example, without being limited to this, the second inorganic layers 320*aa* and 320*ba* disposed between the substrate 310 and the first metal layers 320*ab* and 320*bb* may be omitted depending on the exemplary embodiment.

In summary, the external light absorption layers 320*a*1' and 320*b*1' may include a second inorganic layer, a first metal layer, and a first inorganic layer that are sequentially stacked on the substrate 310, or they may be a multi-layered structure with the stacked first metal layer and the first inorganic layer.

The first metal layers 320*ab* and 320*bb* may be metals with a high absorption coefficient and a high refractive index, e.g., they may include at least one of Cr, Mo, and Ti. The first inorganic layers 320*ac* and 320*bc* and the second inorganic layers 320*aa* and 320*ba* may include, e.g., a metal oxide, a silicon oxide, and a silicon nitride, and for example, they may independently include at least one of, e.g., $SiO_x$, $SiN_x$, $TiO_x$, ITO, $CrO_x$, and $MoO_x$.

By including the external light absorption layers 320*a*1' and 320*b*1', the external light input from the external side of the substrate 310 may be reflected at the interfaces of the respective layers and the reflected light may generate destructive interference. That is, the light blocking effect may be obtained with the organic light-blocking material via destructive interference at interfaces of the different layers.

The reflection layers 320*a*2 and 320*b*2 are disposed between the external light absorption layers 320*a*1' and 320*b*1' and the color conversion layers 330R and 330G or between the external light absorption layers 320*a*1' and 320*b*1' and the transmission layer 330B. The reflection layers 320*a*2 and 320*b*2 reflect the light input to the substrate 310 from the color conversion layers 330R and 330G or the transmission layer 330B to increase the light output ratio.

In detail, the light input to, e.g., transmitted toward, the substrate 310 from the color conversion layers 330R and 330G or the transmission layer 330B may be absorbed by the external light absorption layer when there is no reflection layer. Accordingly, the light output ratio of the color conversion panel may be reduced.

In contrast, according to the present exemplary embodiment, the light emitted toward the reflection layers 320*a*2 and 320*b*2 disposed on the external light absorption layers 320*a*1' and 320*b*1' may be reflected back toward the color conversion layers 330R and 330G or the transmission layer 330B to improve the light output efficiency. The reflection layers 320*a*2 and 320*b*2 may include any suitable metal reflecting light, e.g., at least one of Ag, Au, Cu, Al.

The optical layer 325 is disposed on the substrate 310 and the light blocking layer 320, and the color conversion layers 330R and 330G and the transmission layer 330B are disposed on the optical layer 325.

Referring to FIG. 3, the color conversion panel 30' may further include a red color filter 330R' disposed between the optical layer 325 and the red color conversion layer 330R, and may further include a green color filter 330G' disposed between the optical layer 325 and the green color conversion layer 330G. Further improved color reproducibility may be realized by including the red color filter 330R' and the green color filter 330G'. However, embodiments are not limited thereto, e.g., the plurality of color filters 330R' and 330G' may be omitted. The capping layer 350 is disposed on the color conversion layers 330R and 330G and the transmission layer 330B.

Figure 4:
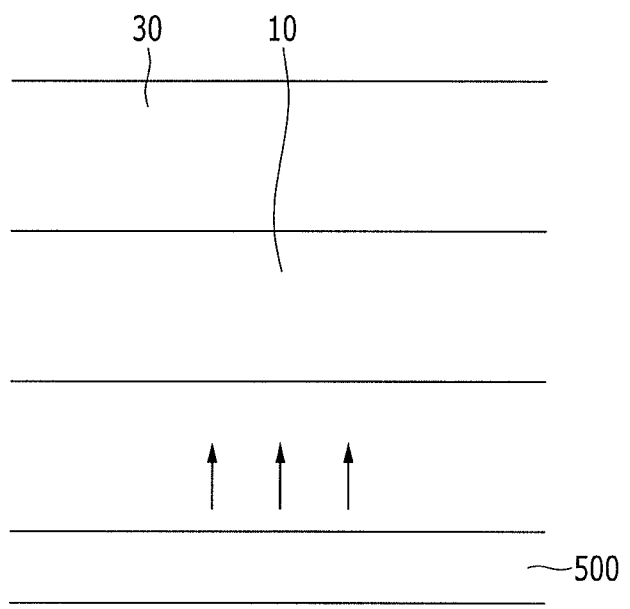
FIG. 4 illustrates a cross-sectional view of a display device according to a present exemplary embodiment.
Figure 5:
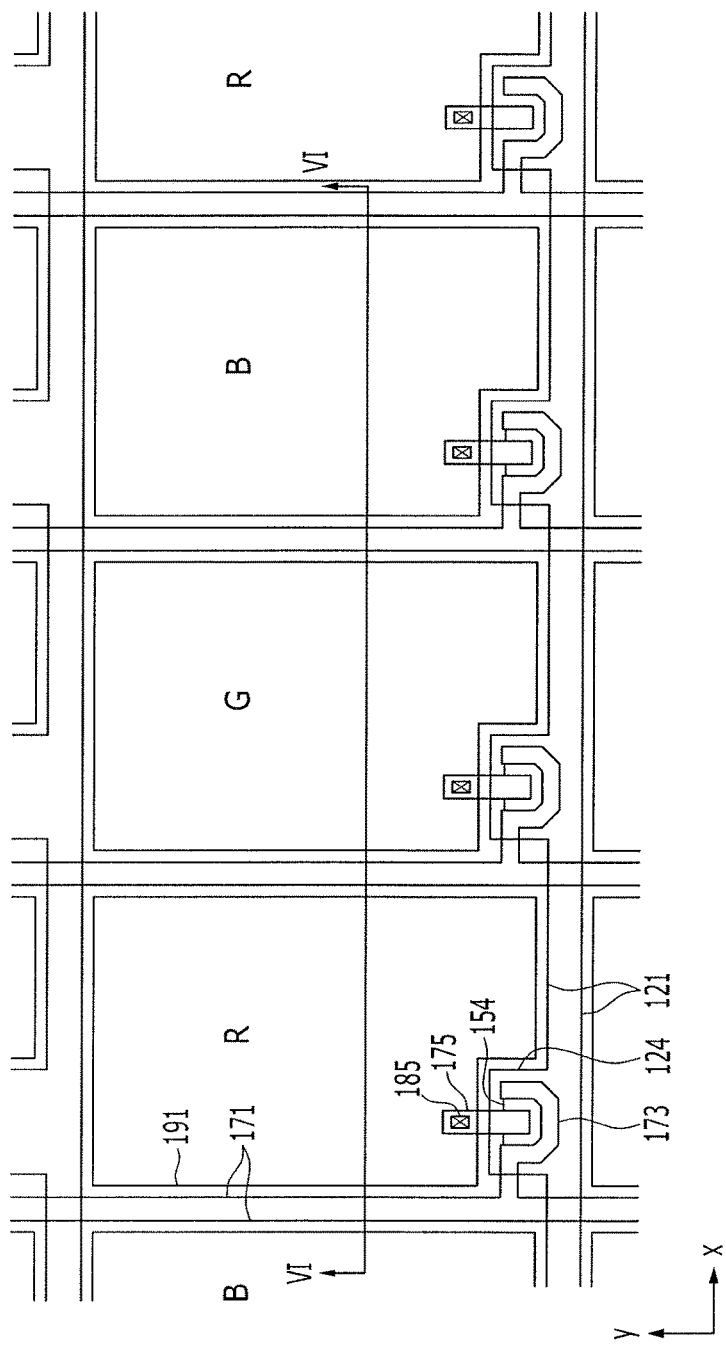
FIG. 5 illustrates a top plan view of a display device according to a present exemplary embodiment.
Figure 6:
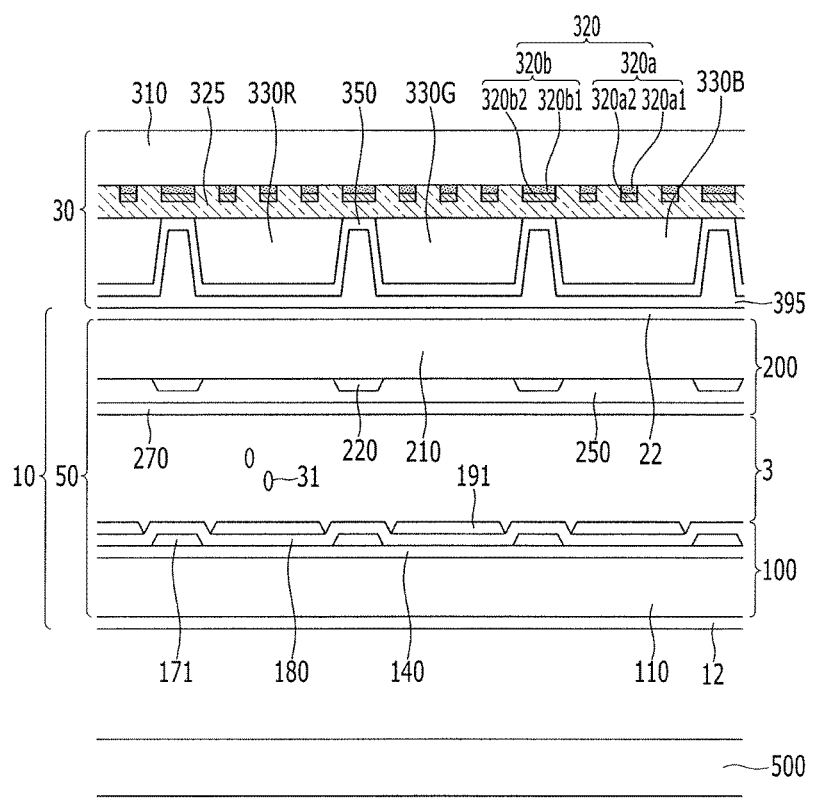
FIG. 6 illustrates a cross-sectional view along line VI-VI of FIG. 5.

A display device according to the present exemplary embodiment will now be described with reference to FIG. 4 to FIG. 6. FIG. 4 shows a schematic cross-sectional view of a display device according to a present exemplary embodiment, FIG. 5 shows a top plan view of a display device according to a present exemplary embodiment, and FIG. 6 shows a cross-sectional view respect to a line VI-VI of FIG. 5. Descriptions of the like or similar constituent elements as the above-described constituent elements will not be disposed.

Referring to FIG. 4, a display device may include the color conversion panel 30, a display panel 10 contacting the color conversion panel 30, and a light assembly 500. The color conversion panel 30 may be the color conversion panel described with reference to FIGS. 1-2 or the color conversion panel 30' described with reference to FIG. 3, and therefore, no detailed description thereof will be provided.

As illustrated in FIG. 6, the color conversion panel 30 may be stacked to be disposed between the display panel 10 and the substrate 310. That is, the color conversion panel 30 may be stacked so that the light blocking layer 320 is disposed between the display panel 10 and the substrate 310, the optical layer 325 is disposed between the light blocking layer 320 and the display panel 10, the color conversion layers 330R and 330G and the transmission layer 330B are disposed between the optical layer 325 and the display panel 10, and the capping layer 350 is disposed between the color conversion layers 330R and 330G and the transmission layer 330B and the display panel 10. Further, the color conversion panel 30 may further include a flat layer 395 so as to provide a flat side that is easy to be bonded to the display panel 10.

In this instance, the color conversion panel 30 according to the present exemplary embodiment includes the light blocking layer 320 disposed between the substrate 310 and the color conversion layers 330R and 330G and between the substrate 310 and the transmission layer 330B. The light blocking layer 320 includes the first sub-light blocking layer 320a and the second sub-light blocking layer 320b. The first sub-light blocking layer 320a is disposed to traverse the color conversion layers 330R and 330G and the transmission layer 330B, overlap the same, and reduce reflection of external light, and the second sub-light blocking layer 320b partitions the region in which the red color conversion layer 330R, the green color conversion layer 330G, and the transmission layer 330B are disposed.

The first sub-light blocking layer 320a and the second sub-light blocking layer 320b respectively include the external light absorption layers 320a1 and 320b1 and the reflection layers 320a2 and 320b2. The external light absorption layers 320a1 and 320b1 reduce reflection caused by external light, e.g., absorb external light incident thereon through the substrate 310 to minimize external light reflected back toward the substrate 310. The reflection layers 320a2 and 320b2 reflect light output by the color conversion layers 330R and 330G and the transmission layer 330B back toward the color conversion layers 330R and 330G and the transmission layer 330B, thereby increasing the light output ratio.

The display panel 10 may include a liquid crystal panel forming a vertical electric field. However, embodiments are not limited thereto, e.g., the display panel may be a liquid crystal panel generating a horizontal electric field, a plasma display panel (PDP), an organic light emitting diode display (OLED), a surface conduction electron-emitter display (SED), a field emission display (FED), a vacuum fluorescent display (VFD), an e-paper, or the like. Hereinafter, the display panel 10 generating the vertical electric field will be exemplarily described in detail.

The light assembly 500 may include a light source positioned under the display panel 10 and generating light, and a light guide receiving the light and guiding the received light in the direction of the display panel 10 and the color conversion panel 30. When the display panel 10 is a self-emissive display device, the light assembly 500 may be omitted.

As an example of the present disclosure, the light assembly 500 may include at least one light emitting diode, and may be a blue light emitting diode. The light source according to the present disclosure may be an edge-type light assembly disposed on at least one side of the light guide plate, or may be a direct-type where the light source of the light assembly 500 is positioned in a directly lower portion of the light guide plate. However, embodiments are not limited thereto.

The display panel 10 according to an exemplary embodiment of the present disclosure will now be described in detail with reference to FIG. 5 and FIG. 6.

Referring to FIGS. 5-6, the display panel 10 may include a liquid crystal panel 50 representing the image and polarizers 12 and 22 on respective surfaces of the liquid crystal panel 50. The first polarizer 12 and the second polarizer 22 for polarizing the light that is incident from the light assembly 500 are disposed at respective sides of the liquid crystal panel 50.

Each of the polarizers 12 and 22 may be at least one of a coating polarizer and a wire grid polarizer. The polarizers 12 and 22 may be positioned at one surface of the display panel 100 and 200 by various methods, e.g., a film method, a coating method, an adhering method, and the like. However, this description is one example and it is not limited thereto.

The liquid crystal panel 50 includes a lower panel 100 including a thin film transistor to display the image, an upper panel 200 including a second insulation substrate 210 overlapping the lower panel 100, and a liquid crystal layer 3 interposed between the lower panel 100 and the upper panel 200. A plurality of pixel electrodes are disposed on the first substrate 110 included by the lower panel 100 in a matrix form.

Provided on the first substrate 110 are a gate line 121 extending in a row direction and including a gate electrode 124, a gate insulating layer 140 disposed on the gate line 121, a semiconductor layer 154 disposed on the gate insulating layer 140, a data line 171 disposed on the semiconductor layer 154, extending in a column direction, and including a source electrode 173, a drain electrode 175, a passivation layer 180 positioned on the data line 171 and the drain electrode 175, and a pixel electrode 191 electrically and physically connected to the drain electrode 175 through a contact hole 185.

The semiconductor layer 154 positioned on the gate electrode 124 forms a channel layer in the region that is exposed by the source electrode 173 and the drain electrode 175. The gate electrode 124, the semiconductor layer 154, the source electrode 173, and the drain electrode 175 form one thin film transistor.

The second substrate 210 overlaps the first substrate 110 and is separated from the same. A light blocking member 220, a flat layer 250, and a common electrode 270 are disposed between the second substrate 210 and the liquid crystal layer 3.

The light blocking member 220 is disposed between the second substrate 210 and the liquid crystal layer 3. The flat layer 250 for providing a flat side may be disposed between the light blocking member 220 and the liquid crystal layer 3, and the common electrode 270 is disposed between the flat layer 250 and the liquid crystal layer 3. The flat layer 250 may be omitted depending on the exemplary embodiment. The common electrode 270 receiving the common voltage generates an electric field with the pixel electrode 191 to arrange the liquid crystal molecules 31 disposed on the liquid crystal layer 3.

The liquid crystal layer 3 includes a plurality of liquid crystal molecules 31, and an arranging direction of the liquid crystal molecules 31 is controlled by the electric field between the pixel electrode 191 and the common electrode 270. The image may be displayed by controlling transmittance of the light received from the light assembly 500 according to the arrangement of the liquid crystal molecules.

One pixel electrode connected to one thin film transistor on the display panel 10 is defined to be one pixel, and at least one pixel may be disposed to overlap the red color conversion layer 330R, the green color conversion layer 330G, and the transmission layer 330B.

Figure 7:
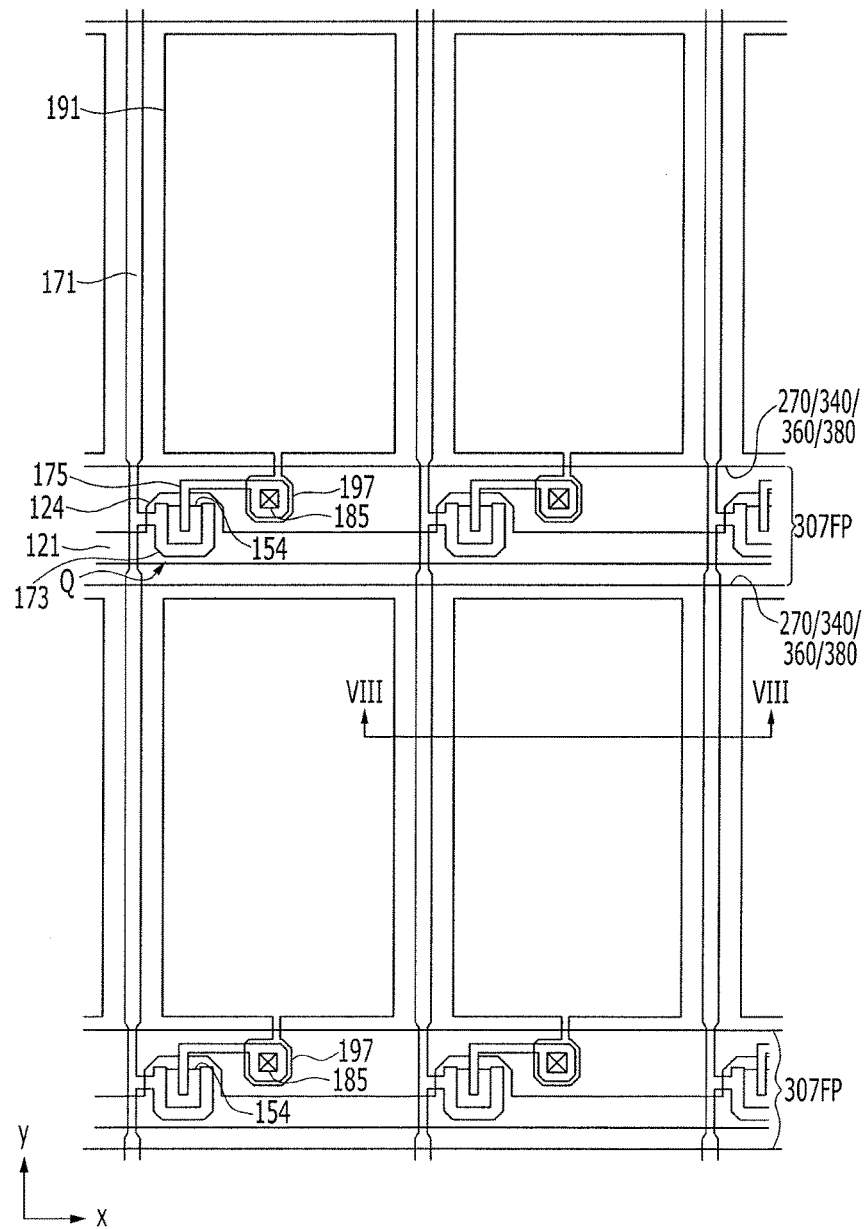
FIG. 7 illustrates a top plan view of a device according to a present exemplary embodiment.
Figure 8:
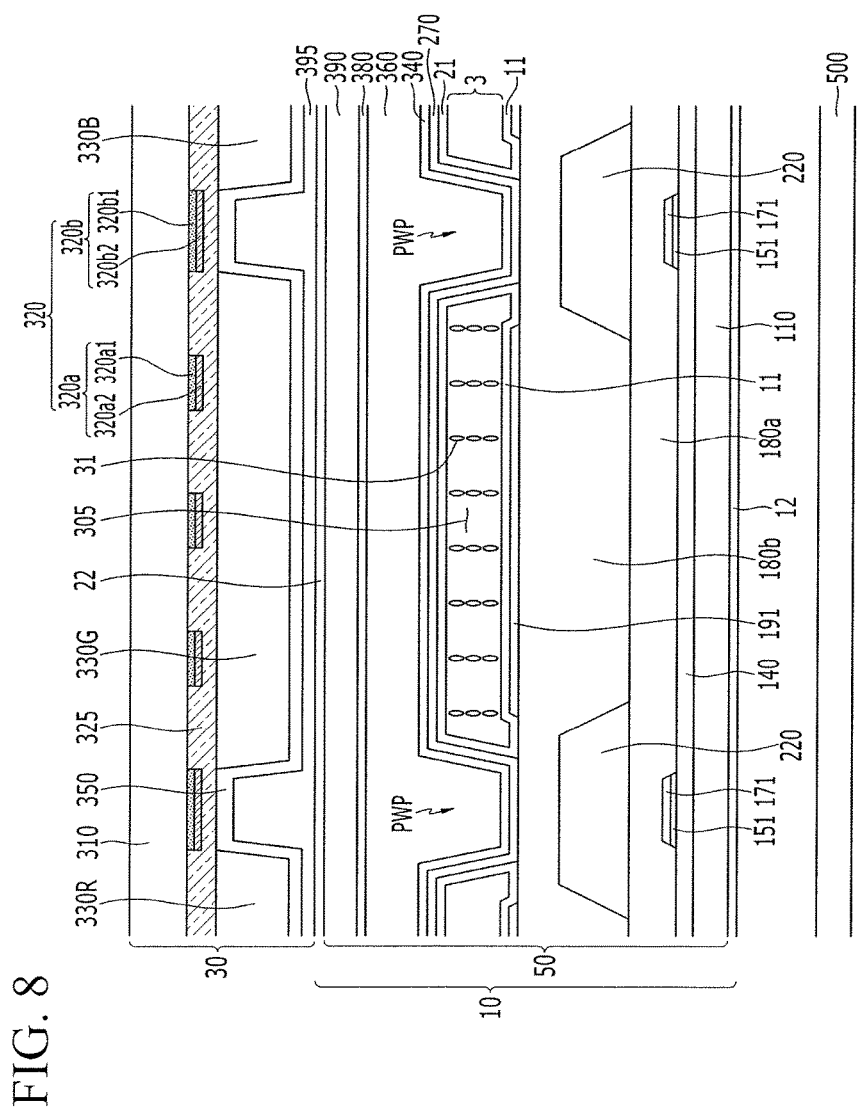
FIG. 8 illustrates a cross-sectional view along line VIII-VIII of FIG. 7.

A display device according to a varied exemplary embodiment will now be described with reference to FIG. 7 and FIG. 8. FIG. 7 shows a top plan view of a device according to a present exemplary embodiment, and FIG. 8 shows a cross-sectional view along line VIII-VIII of FIG. 7. Description of the like or similar constituent elements as the above-described constituent elements will not be repeated.

Regarding the display device according to the present exemplary embodiment, the display device includes the color conversion panel 30, the display panel 10 contacting the color conversion panel 30, and the light assembly 500. The color conversion panel may be any one of the color conversion panels described with reference to FIG. 1 to FIG. 3, and no detailed description thereof will be repeated.

The color conversion panel 30 may be stacked to be disposed between the display panel 10 and the substrate 310. In detail, the color conversion panel 30 may be stacked so that the light blocking layer 320 is disposed between the display panel 10 and the substrate 310, the optical layer 325 is disposed between the light blocking layer 320 and the display panel 10, the color conversion layers 330R and 330G and the transmission layer 330B are disposed between the optical layer 325 and the display panel 10, and the capping layer 350 is disposed between the color conversion layers 330R and 330G and the transmission layer 330B and the display panel 10. Further, the color conversion panel 30 may include the flat layer 395 so as to provide a flat side that is easy to be bonded to the display panel 10.

The light blocking layer 320 includes the first sub-light blocking layer 320a and the second sub-light blocking layer 320b, the first sub-light blocking layer 320a is disposed to traverse the color conversion layers 330R and 330G and the transmission layer 330B, overlap the same, and reduce reflection of external light, and the second sub-light blocking layer 320b partitions the region in which the red color conversion layer 330R, the green color conversion layer 330G, and the transmission layer 330B are disposed.

The first sub-light blocking layer 320a and the second sub-light blocking layer 320b respectively include external light absorption layers 320a1 and 320b1 and reflection layers 320a2 and 320b2. The external light absorption layers 320a1 and 320b1 may reduce the reflection caused by external light, and the reflection layers 320a2 and 320b2 may reflect the light output by the color conversion layers 330R and 330G and the transmission layer 330B to the color conversion layers 330R and 330G and the transmission layer 330B, thereby increasing the light output ratio.

FIG. 7 shows a 2×2 pixel from among a plurality of pixels respectively corresponding to a plurality of microcavities 305. The display device according to the present exemplary embodiment may repeatedly arrange the pixels from top to bottom and from right to left.

The liquid crystal panel 50 includes a gate line 121 disposed on the first substrate 110, and the gate line 121 includes a gate electrode 124. A gate insulating layer 140 is disposed on the first substrate 110 and the gate line 121. A semiconductor layer 151 and a semiconductor layer 154 are disposed on the gate insulating layer 140, and the semiconductor layer 151 is disposed below the data line 171, while the semiconductor layer 154 is disposed below the source and drain electrodes 173 and 175 and a channel portion of a thin film transistor Q.

The data conductors 171, 173, and 175 including the data line 171 including the source electrode 173 as well as the drain electrode 175 are disposed on the semiconductor layers 151 and 154 and the gate insulating layer 140. The gate electrode 124, the source electrode 173, and the drain electrode 175 form the thin film transistor Q together with the semiconductor layer 154, and the channel of the thin film transistor Q is disposed at the semiconductor layer 154 between the source electrode 173 and the drain electrode 175.

A first passivation layer 180a may be disposed on the data conductors 171, 173, and 175 and an exposed portion of the semiconductor layer 154. The first passivation layer 180a may include an inorganic insulator or an organic insulator, e.g., a silicon nitride ($SiN_x$) or a silicon oxide ($SiO_x$).

A light blocking member 220 and a second passivation layer 180b are disposed on the first passivation layer 180a. The light blocking member 220 is formed to have a lattice structure disposed with an opening corresponding to an area for displaying an image, and is made of a material that does not transmit light. The second passivation layer 180b may include an inorganic insulator or an organic insulator, e.g., silicon nitride ($SiN_x$) or a silicon oxide ($SiO_x$). The first and second passivation layers 180a and 180b and the light blocking member 220 include a contact hole 185 for exposing the drain electrode 175.

The pixel electrode 191 is disposed on the second passivation layer 180b. The pixel electrode 191 may be made of a transparent conductive material, e.g., an ITO or an IZO. The pixel electrode 191 may have an overall quadrangular shape, and may include a protrusion 197 protruding toward the thin film transistor Q. The protrusion 197 may be physically and electrically connected to the drain electrode 175 through the contact hole 185.

The above-described thin film transistor Q and pixel electrode 191 are just examples, but the structure of the thin film transistor and the design of the pixel electrode are not limited thereto, and may be changed to be variously applied.

A lower alignment layer 11 is positioned on the pixel electrode 191, and an upper alignment layer 21 is disposed to overlap the lower alignment layer 11. The lower alignment layer 11 and the upper alignment layer 21 may be vertical alignment layers.

In the present exemplary embodiment, a plurality of liquid crystal molecules 31 and an alignment material for forming the alignment layers 11 and 21 may be injected into the microcavities 305 by using capillary force. In the present exemplary embodiment, the lower alignment layer 11 and the upper alignment layer 21 are distinguished from each other only by their positions, and as shown in FIG. 8, may be connected to each other. The lower alignment layer 11 and the upper alignment layer 21 may be simultaneously formed.

The microcavities 305 are disposed between the lower alignment layer 11 and the upper alignment layer 21, and the liquid crystal molecules 31 injected into the microcavities 305 form the liquid crystal layer 3. The plurality of the microcavities 305 may be arranged in a matrix form. The microcavities 305 adjacent in a y direction may be distinguished from each other by a plurality of liquid crystal inlets 307FP overlapping the gate lines 121. The microcavities 305 adjacent in an x direction may be distinguished from each other by a partition wall portion PWP. Each of the microcavities 305 may correspond to one or more pixel areas, and the pixel areas may correspond to an area for displaying an image.

The common electrode 270 and a third passivation layer 340 are disposed on the upper alignment layer 21. The common electrode 270 receives a common voltage, generates an electric field along with the pixel electrode 191 receiving a data voltage, and determines a direction in which the liquid crystal molecules 31 disposed in the microcavities 305 between two electrodes are inclined. The third passivation layer 340 may be made of a silicon nitride (SiNx) or a silicon oxide (SiOx).

In the present exemplary embodiment, it is described that the common electrode 270 is positioned on the microcavities 305, but in some exemplary embodiments, the common electrode 270 may be positioned below the microcavities 305 such that the liquid crystals may be driven according to a coplanar electrode (CE) mode.

A roof layer 360 is disposed on the third passivation layer 340. The roof layer 360 serves to support the pixel electrode 191 and the common electrode 270 so that the microcavities 305 corresponding to spaces between the pixel electrode 191 and the common electrode 270 may be formed.

A fourth passivation layer 380 is disposed on the roof layer 360. The fourth passivation layer 380 may contact an upper side of the roof layer 360, and may be omitted depending on the exemplary embodiment.

A cover layer 390 is disposed on the fourth passivation layer 380. The cover layer 390 includes an organic material or an inorganic material. In the present exemplary embodiment, the cover layer 390 may be disposed in a liquid crystal inlet 307FP as well as on the fourth passivation layer 380. In this instance, the cover layer 390 may cover the liquid crystal inlet 307FP of the microcavity 305 exposed by the liquid crystal inlet 307FP.

The display device according to the present exemplary embodiment may improve the light output ratio and the color reproducibility to provide the display device with excellent displaying quality and may use a single sheet of substrate to simplify the manufacturing process and structure.

Figure 9:
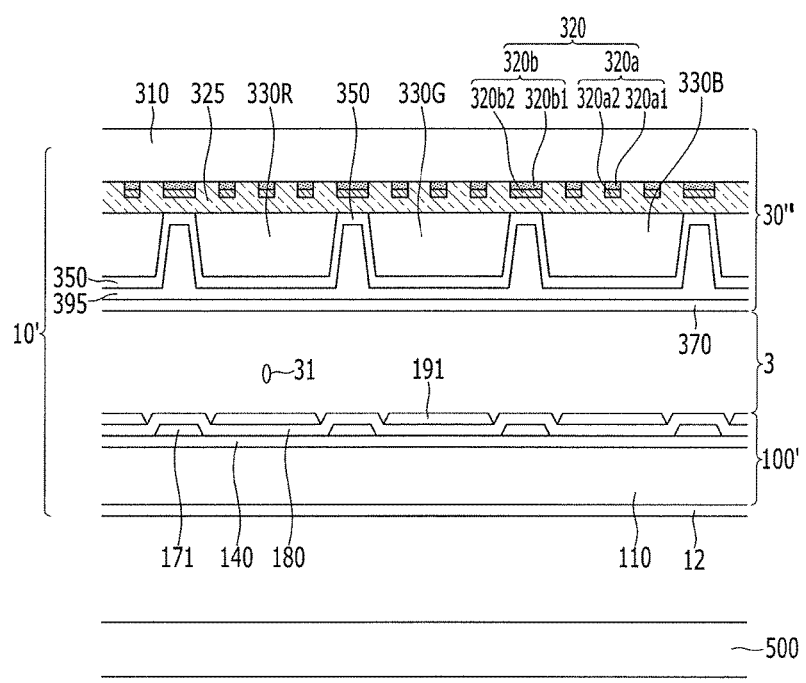
FIG. 9 illustrates a cross-sectional view of a display device according to a present exemplary embodiment.

A display device according to a varied exemplary embodiment will now be described with reference to FIG. 9. FIG. 9 shows a cross-sectional view of a display device according to a present exemplary embodiment.

The display device shown in FIG. 9 includes a display panel 10' and a light assembly 500. A display panel 10' may be positioned on the light assembly 500, and without being limited to this, the positioning is variable according to the exemplary embodiment.

The display panel 10' includes a thin film transistor panel 100', a color conversion panel 30" facing the thin film transistor panel 100' and separated therefrom, and a liquid crystal layer 3 disposed between the thin film transistor panel 100' and the color conversion panel 30" and including liquid crystal molecules 31. Unlike the aforementioned exemplary embodiments, the color conversion panel 30" is a portion of the display panel 10' according to the present exemplary embodiment.

The thin film transistor panel 100' corresponds to the lower panel 100 of FIG. 5 and FIG. 6 and the color conversion panel 30" is similar to the color conversion panel 30 of FIG. 1 and FIG. 2, so FIG. 1, FIG. 2, FIG. 5, and FIG. 6 will be referred to in addition to FIG. 9.

The thin film transistor panel 100' includes a gate line 121 extending in a row direction on the first substrate 110 and including a gate electrode 124, a gate insulating layer 140 disposed on the gate line 121, a semiconductor layer 154 disposed on the gate insulating layer 140, a data line 171 and a drain electrode 175 disposed on the semiconductor layer 154, extending in a column direction, and including a source electrode 173, and a pixel electrode 191 physically electrically connected to the drain electrode 175 through the passivation layer 180 and the contact hole 185 disposed on the data line 171 and the drain electrode 175.

The semiconductor layer 154 disposed on the gate electrode 124 forms a channel layer in a region exposed by the source electrode 173 and the drain electrode 175, and the gate electrode 124, the semiconductor layer 154, the source electrode 173, and the drain electrode 175 form one thin film transistor.

The color conversion panel 30" includes a substrate 310 overlapping the first substrate 110 and separated therefrom. The color conversion panel 30" includes a light blocking layer 320 disposed between the substrate 310 and the liquid crystal layer 3, an optical layer 325 disposed between the light blocking layer 320 and the liquid crystal layer 3, a plurality of color conversion layers 330R and 330G and a transmission layer 330B disposed between the optical layer 325 and the liquid crystal layer 3, a capping layer 350 disposed between a plurality of color conversion layers 330R and 330G and a transmission layer 330B and a liquid crystal layer 3, a flat layer 395 disposed between the capping layer 350 and the liquid crystal layer 3, and a common electrode 370 disposed between the flat layer 395 and the liquid crystal layer 3. The common electrode 370 receiving a common voltage generates an electric field along with the pixel electrode 191 to control the liquid crystal molecules 31 of the liquid crystal layer 3.

The liquid crystal layer 3 includes a plurality of liquid crystal molecules 31, and the arranging direction of the liquid crystal molecules 31 is controlled by the electric field generated between the pixel electrode 191 and the common electrode 370. The image may be displayed by controlling transmittance of the light received from the light assembly 500 according to the arrangement of the liquid crystal molecules.

The display device according to the present exemplary embodiment described above does not include the upper panel 200 described with reference to FIG. 6, and the color conversion panel 30" replaces the upper panel in function and position. According to such a display device, it is possible to reduce the thickness, the weight, and the cost thereof.

By way of summation and review, light loss may occur at the polarizer and the color filter of the display device. Accordingly, a display device that may reduce light loss and include a color conversion panel for realizing high efficiency is required. Therefore, embodiments provide a color conversion panel for reducing reflection of external light and improving reproducibility of colors, and a display device including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A color conversion panel, comprising:
a substrate;
a light blocking layer on the substrate; and
color conversion layers and a transmission layer on the substrate, the color conversion layers including a quantum dot,
wherein the light blocking layer includes:
a first sub-light blocking layer overlapping the color conversion layers and the transmission layer, and
a second sub-light blocking layer between adjacent ones of the color conversion layers and the transmission layer, and
wherein each of the first sub-light blocking layer and the second sub-light blocking layer includes an external light absorption layer on the substrate, and a reflection layer on the external light absorption layer.

2. The color conversion panel as claimed in claim 1, wherein the first sub-light blocking layer is narrower than the second sub-light blocking layer.

3. The color conversion panel as claimed in claim 1, wherein the external light absorption layer includes an organic light-blocking material.

4. The color conversion panel as claimed in claim 1, wherein the external light absorption layer includes:
a first metal layer on the substrate; and
a first inorganic layer on the first metal layer.

5. The color conversion panel as claimed in claim 4, further comprising a second inorganic layer between the first metal layer and the substrate.

6. The color conversion panel as claimed in claim 5, wherein the first inorganic layer and the second inorganic layer include at least one of a metal oxide, a silicon oxide, and a silicon nitride.

7. The color conversion panel as claimed in claim 4, wherein the first metal layer includes at least one of Cr, Mo, and Ti.

8. The color conversion panel as claimed in claim 1, wherein the reflection layer includes a metal material.

9. The color conversion panel as claimed in claim 1, further comprising an optical layer between the light blocking layer and each of the color conversion layer and the transmission layer, a refractive index of the optical layer being about 1.0 to about 1.4.

10. The color conversion panel as claimed in claim 1, further comprising a color filter between the substrate and the color conversion layer.

11. The color conversion panel as claimed in claim 1, further comprising a capping layer between the color conversion layer and the transmission layer.

12. A display device, comprising:
a display panel; and
a color conversion panel on the display panel, the color conversion panel including:
a substrate overlapping the display panel,
a light blocking layer between the substrate and the display panel, and
color conversion layers and a transmission layer between the substrate and the display panel, the color conversion layers including a quantum dot,
wherein the light blocking layer includes:
a first sub-light blocking layer overlapping the color conversion layer and the transmission layer, and
a second sub-light blocking layer between adjacent ones of the color conversion layers and the transmission layer, and
wherein each of the first sub-light blocking layer and the second sub-light blocking layer includes an external light absorption layer between the substrate and the display panel, and a reflection layer between the external light absorption layer and the display panel.

13. The display device as claimed in claim 12, wherein the first sub-light blocking layer is narrower than the second sub-light blocking layer.

14. The display device as claimed in claim 12, wherein the display panel includes a plurality of pixels in a matrix form, and the color conversion layers and the transmission layer respectively overlap at least one of the pixels.

15. The display device as claimed in claim 12, wherein the external light absorption layer includes an organic light-blocking material.

16. The display device as claimed in claim 12, wherein the external light absorption layer includes:
a first metal layer between the substrate and the display panel; and
a first inorganic layer between the first metal layer and the display panel.

17. The display device as claimed in claim 16, further comprising a second inorganic layer between the first metal layer and the substrate.

18. The display device as claimed in claim 12, further comprising an optical layer between the light blocking layer and each of the color conversion layer and transmission layer, a refractive index of the optical layer being about 1.0 to about 1.4.

* * * * *